United States Patent
Sakamoto et al.

(10) Patent No.: US 6,878,318 B2
(45) Date of Patent: Apr. 12, 2005

(54) METHODS FOR PRODUCING MULTI-LAYER FOAMED SHEETS

(75) Inventors: Akinobu Sakamoto, Sodegaura (JP); Shigehumi Takuno, Ichihara (JP); Tatsuhiro Nagamatsu, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 253 days.

(21) Appl. No.: 10/071,185

(22) Filed: Feb. 11, 2002

(65) Prior Publication Data

US 2002/0163098 A1 Nov. 7, 2002

(30) Foreign Application Priority Data

Feb. 15, 2001 (JP) ........................... 2001-038114
Sep. 25, 2001 (JP) ........................... 2001-290828

(51) Int. Cl.⁷ .............................................. B29C 44/24
(52) U.S. Cl. ............................ 264/45.9; 264/173.12; 264/173.16; 264/920
(58) Field of Search .................. 264/45.9, 173.12, 264/173.16, 920

(56) References Cited

U.S. PATENT DOCUMENTS 6,562,276 B1 * 5/2003 Shelby et al. ............ 264/328.8

FOREIGN PATENT DOCUMENTS

| EP | 1 075 921 A2 | 2/2001 |
| JP | 7-16971 A | 1/1995 |
| JP | 2001-113655 A | 4/2001 |

* cited by examiner

Primary Examiner—Allan R. Kuhns
(74) Attorney, Agent, or Firm—Sughrue Mion, PLLC

(57) ABSTRACT

The invention provides, as a method for producing a multi-layer foamed sheet whose scale-like appearance has been improved by means of a multi-layer circular die coextrusion method, a method for producing a multi-layer foamed sheet having foam layers and non-foam layers by a multi-layer circular die coextrusion method which is a method for producing a multi-layer foamed sheet wherein the shear stress at the interface of each layer is 5000 Pa or higher and not higher than 50000 Pa, a method for producing a multi-layer foamed sheet wherein the resin of said non-foam layer is a linear propylenic resin having a melt flow rate of 5 to 30 g/10 minutes, and a method for producing a multi-layer foamed sheet wherein the resin of said foam layer is a propylenic resin whose melt tension (MT) at 190° C. and melt flow rate (MFR) at 230° C. satisfy the following equation A:

$$MT \geq 7.52 \times MFR^{(-0.576)} \quad \text{[Equation A]}$$

6 Claims, No Drawings

METHODS FOR PRODUCING MULTI-LAYER FOAMED SHEETS

FIELD OF THE INVENTION

The present invention relates to a method for producing a multi-layer foamed sheet consisting of a structure having plural layers by means of a circular die coextrusion method.

BACKGROUND OF THE INVENTION

As an advantageous method for producing a multi-layer foamed sheet consisting of a structure having plural layers, a coextrusion method is proposed wherein resin materials corresponding to respective layers are plasticized and melted using plural extruders and then molten resins supplied from respective extruders are laminated and integrated in a die with each upon extruded out of a die.

Japanese Unexamined Patent Publication No. 7-16971 discloses that an unevenness in the widthwise thickness of each layer can be improved by performing a coextrusion T die foaming procedure while adjusting the fluidity of a polyolefinic resin layer (A) at a level similar to that of a foaming polyolefinic resin layer (B) upon the coextrusion.

Such unevenness in the thickness is a drawback experienced frequently in a feed-block T die coextrusion procedure We made an effort in searching for a method for producing a multi-layer foamed sheet by a multi-layer circular die coextrusion method, and discovered that, in the multi-layer circular die coextrusion method generally employing a multi-manifold system, poor appearance is observed rather as a pattern of scales having diameters of several centimeters rather than as a wide-ranged drawback such as described above. An object of the invention is to provide a method for producing a multi-layer foamed sheet whose scale-like poor appearance is improved by means of a multi-layer circular die coextrusion method.

SUMMARY OF THE INVENTION

The invention relates to a method for producing a multi-layer foamed sheet having foam layers and non-foam layers by a multi-layer circular die coextrusion method wherein the shear stress at the interface of each layer is 5000 Pa or higher and not higher than 50000 Pa.

The invention is further described below.

DETAILED DESCRIPTION OF THE INVENTION

A higher shear stress at the interface of each layer according to the invention (layer-interface shear stress) may lead to a disturbance in the layer structure at each layer interface which may result in a scale-like poor appearance.

In a production of a multi-layer foamed sheet having foam layers and non-foam layers by a multi-layer circular die coextrusion method, the shear stress at said interface of each layer at the time when the multi-layer sheet is extruded through a die lip is preferably not higher than 50000 Pa, more preferably not higher than 45000 Pa, particularly not higher than 40000 Pa. A lower shear stress at the layer interface tends to ameliorate the scale-like poor appearance.

While the lower limit of the shear stress of a layer interface is 5000 Pa, a stress below this lower limit may lead to a disadvantage other than the scale-like poor appearance, such as a reduced producibility and a coarse cell. The lower limit preferably exceeds 25000 Pa.

While the shear stress at a layer interface is preferably lower within the range specified above, it may vary depending on the purpose of use. For example, in a case where a pigment is incorporated to the both layers in contact with a interface at which a disturbance occurs readily, the disturbed layer structure can readily be concealed and a disturbance to some extent is not problematic practically.

On the other hand, in a case where an expensive functional material-containing layer is preferred to be laminated as a thin uniform surface layer, a further lower shear stress is preferred.

A procedure for obtaining a shear stress at a layer interface is discussed below.

As a constitutive equation indicating the Theological characteristics of a molten resin, the power-law model represented by Equation 1 shown below is employed.

$$\tau = K\gamma^n \qquad \text{Equation 1}$$

wherein $\tau$ is a shear stress (Pa), $\gamma$ is a shear rate (s$^{-1}$), K is a constant (Pa·s$^n$) and n is a constant (non-dimensional number).

Constants K and n which are specific to the molten resin of each layer mentioned here are determined in accordance with Equations 6 and 7 shown in Examples after a capillary rheometer measurement at a processing temperature.

Subsequently, using Constants K and N of a molten resin employed in each layer and the processing parameters such as the die shape and the extrusion output of each layer, a multi-layer fluidization analysis is performed according to a reference J. Appl. Polym. Sci., 17, 1203 (1973) whereby obtaining the shear stress of a layer interface.

As a method for reducing or controlling the shear stress of a layer interface, any of or a combination of the following four strategies can be employed.

Strategy 1: The entire extrusion output is reduced to reduce the pressure at a die lip.

Strategy 2: The lip gap is enlarged to reduce the pressure at a die lip (when the die diameter is fixed).

Strategy 3: The layer interface is made closer to the thickness-wise center at which the shear stress is lower for example by altering the extrusion output ratio between layers to increase the thickness of the outermost layer in contact with the lip wall.

Strategy 4: The fluidity of each resin (especially of the outermost layer) is increased.

Nevertheless, Strategy 1 for reducing the shear stress of a layer interface tends to affect the producibility adversely, and it is disadvantageous also due to an excessive foaming in the die which allows a cell to be collapsed. Strategy 2 also involves an excessive foaming in the die to undergo the cell collapse, and its application tends to be limited to a thick material. Strategy 3 is valid when applied to a multi-layer foam having a thick lamination of a non-foam outermost layer on an intermediate foam which is desired to have a high mechanical parameter especially in terms of a flexural rigidity. However, when an expensive functional material is laminated to a foam to obtain a high added value, the thickness of a functional material can be minimized as far as possible.

The applicants made an effort in investigating Strategies 1 to 4 for reducing the shear stress of a layer interface, and concluded that Strategy 4, alone or in combination with other Strategies, is the most preferable method in view of the producibility, the foamability and the range of final products and also because of its applicability to various uses and purposes.

In Strategy 4, a resin layer whose fluidity is increased is most preferably the outermost layer in contact with a die lip wall at which a high shear stress is exerted. Since the shear stress is low at the thickness-wise center, any increase in a resin layer fluidity may be less effective.

While the shear stress of a layer interface is determined by Constants K and N of a molten resin employed in each layer and the processing parameters such as the die shape and the extrusion output of each layer, an increase in a resin fluidity in Strategy 4 for reducing the shear stress means a reduction in Constants K, and thus the selection and the controlling of this Constant K is the most effective measure in view of the producibility, the foamability and the range of final products. In addition, it is also advantageous to combine this strategy with the control of the extrusion output of each layer (Strategy 1, Strategy 3) and the control of the die shape (Strategy 2 and die size).

Constant K can be controlled for example by adjusting the resin polymerization conditions appropriately or by adjusting the amount of an organic peroxide which is added at a low level upon pelletizing a polymerization powder, as in a known method employed customarily for adjusting the MFR. A method based on the resin temperature during a processing is also effective unless it affects the foamability adversely.

In a preferred structure of plural layers consisting of foam layers and non-foam layers, a foam layer is located as an intermediate layer at which the shear stress is low (and which is far from the die wall) for the purpose of preventing any shear stress-induced collapse of a cell generated in the die, except for the case where the foam layer, even when it is a layer close to a die wall, has a low expansion ratio and prepared using a trace amount of a foaming agent.

A two-material three-layered structure is preferably a non-foam layer/foam layer/non-foam layer structure, while a three-material five-layered structure is preferably a non-foam layer/recycle layer/foam layer/recycle layer/non-foam layer structure. Any of such layer structures exhibits preferable high mechanical performance and abilities of imparting a surface layer with functions.

A multi-layer foamed sheet of the invention can be recycled. A recycling method may for example be accomplished by grinding the resultant multi-layer foamed sheet using a grinder followed if necessary by deaerating and pelletizing the resultant chip using an extruder whereby producing a regenerated pellet which is ready to use. These chip and regenerated pellet are introduced into an extruder for a recycle layer and supplied to a multi-layer die having a channel structure for the recycle layer. The recycle layer is a non-foam layer and similarly has an MFR preferably of 5 to 30 g/10 minutes, and the shear stress at the interface between the recycle layer and another layer is controlled to be 5000 Pa or higher but not higher than 50000 Pa.

A resin employed in a foam layer or a non-foam layer in the invention is preferably a propylenic resin, and such propylenic resin has as its main constituent a non-branched non-bridged linear polypropylene optionally in a blend with other olefinic resins such as ethylenic resins including low density polyethylenes and high density polyethylene in a small, for example, up to 40% by weight.

A resin employed in a non-foam layer is preferably a linear propylenic resin having a MFR of 5 g/10 minutes or more but not more than 30 g/10 minutes. A lower MFR may lead to a higher shear stress at a layer interface, which tends to cause a scale-like poor appearance. A higher MFR may lead to a difficulty in allowing a non-foam layer to retain foaming gas once diffused from a foam layer into a non-foam layer which may result in a degassing or may lead to a difficulty in maintaining the die pressure sufficiently which may result in an adverse effect other than the scale-like poor appearance. In the invention, an improvement in the scale-like poor appearance simultaneously with a prevention of the degassing can be accomplished preferably by producing a multi-layer foamed sheet having non-foam layers on its both surfaces and an internal foam layer using as a resin for the non-foam layers a linear propylenic resin whose MFR is 5 g/10 minutes or more but not more than 12 g/10 minutes (more preferably 5 g/10 minutes or more but not more than 8 g/10 minutes) under the condition capable of giving a shear stress at each layer interface which exceeds 40000 Pa but not more than 50000 Pa by means of a multi-layer circular die coextrusion method.

A linear propylenic resin mentioned here means a polymer obtained by using an ordinary Ziegler-Natta catalyst to homopolymerize a propylene or to copolymerize a propylene with ethylene and/or a comonomer such as an α-olefin having 4 to 12 carbon atoms in an amount which does not allow the crystallinity to be lost.

While this linear propylenic resin may be a single resin, it may also be a formulation of two or more components, as long as the MFR of the entire linear propylenic resin is within the specified range.

In the present invention, a resin employed in a foam layer is preferably a resin having a high melt strength for the purpose of making it difficult to undergo a cell collapse upon a deformation during a foaming and expanding process, and one which is preferred is a propylene polymer whose melt tension (MT) at 190° C. and melt flow rate (MFR) at 230° C. satisfy the following equation A:

$$MT \geq 7.52 \times MFR^{(-0.576)} \quad \text{[Equation A]}$$

More preferably, a resin employed in a foam layer is a propylene polymer (T) listed below into which a super-high molecular weight component is incorporated.

Thus, a propylene polymer (T) obtained by a polymerization method comprising a step for producing a crystalline propylene polymer moiety (A) having an intrinsic viscosity of 5 dl/g or higher and a step for producing a crystalline propylene polymer moiety (B) having an intrinsic viscosity less than 3 dl/g wherein the intrinsic viscosity of the entire resin is less than 3 dl/g and wherein the crystalline propylene polymer moiety (A) is present in an amount of 0.05% by weight or higher and less than 35% by weight based on the entire resin is employed.

Such propylene polymer (T) is a polymer obtained by a polymerization method involving a step for producing (A) and a step for producing (B). For example, it is a polymer obtained by a batch polymerization procedure in which (A) is polymerized on the first stage and then (B) is polymerized on the second stage in the polymerization reactor which is same to the reactor in which (A) is polymerized or by a continuous polymerization procedure employing reciprocally aligned two or more reactors in which (A) is polymerized on the first stage and the resultant product is transferred to the next reactor where (B) is polymerized on the second stage. In the case of a continuous polymerization procedure, the number of the reactors for each of the first and second stages may be one or two or more.

Since the melt strength of such propylene polymer (T) is preferably high for the purpose of obtaining a foam, the intrinsic viscosity of (A) is preferably 5 dl/g or higher, more preferably 6 dl/g or higher, particularly 7 dl/g or higher. While the intrinsic viscosity of (A) becomes more preferred when it becomes higher with no particular upper limit specified, it is usually less than 15 dl/g. More preferably, the intrinsic viscosity of (A) is 6 to 13 dl/g, particularly 7 to 11 dl/g.

A crystalline propylene polymer moiety (A) is present preferably in an amount of 0.05% by weight or higher, more preferably 0.3% by weight or higher based on a propylene polymer (T) in view of the melt strength. Also in view of the elongation profile, the amount of a crystalline propylene polymer moiety (A) becomes more preferred when it becomes lower as long as a melt strength sufficient for obtaining a foam is possessed, and in general it is preferably less than 35% by weight, more preferably not higher than 20% by weight. Thus, the amount of a crystalline propylene polymer moiety (A) in such propylene polymer (T) is preferably 0.05% by weight or higher and less than 35% by weight, more preferably 0.3 to 20% by weight. The amount of (A) can be adjusted appropriately during a polymerization step for example by controlling the polymerization conditions, or during a melting or kneading step by incorporating additional component (B).

In view of the fluidity and the processability, the intrinsic viscosity of (B) is preferably less than 3 dl/g, and also in view of the fluidity and the processability the intrinsic viscosity of an entire propylene polymer (T) is also less than 3 dl/g. The MFR of an entire propylene polymer (T) is preferably within the range from 5 g/10 minutes to 30 g/10 minutes. An excessively high MFR leads to a difficulty in maintaining a melt tension required for a foaming, while an excessively low MFR leads to an adverse effect on the processability, especially an effect of a heat generation and an elevated resin temperature due to a shear stress. More preferably, the MFR is 8 g/10 minutes or higher but not higher than 25 g/10 minutes. Especially, the MFR is 10 g/10 minutes or higher but not higher than 20 g/10 minutes.

Also in view of the appearance of a foam, the molecular weight distribution of an entire propylene polymer (T) is preferably 15 or lower, more preferably less than 10, especially 5 to 9. A molecular weight distribution mentioned in the invention is based on the ratio (Mw/Mn) between a weight average molecular weight (Mw) and a number average molecular weight (Mn).

When a polymerization is effected continuously, the intrinsic viscosity of (B) can be adjusted within the range specified above by selecting an appropriate condition under which (B) is produced. Assuming that a rule of addition is applicable generally to the intrinsic viscosity and referring to the case of a propylene polymer (T) consisting of (A) and (B), the intrinsic viscosity of (B) can be obtained by the following Equation 2 from the intrinsic viscosity $[\eta]_T$ of the final propylene polymer (T), the intrinsic viscosity $[\eta]_A$ of (A), and the amount of each of (A) and (B) in (T) (% by weight).

$$[\eta]_B = ([\eta]_T \times 100 - [\eta]_A \times W_A) \div W_B \quad \text{[Equation 2]}$$

wherein $[\eta]_T$ is the intrinsic viscosity (dl/g) of a propylene polymer (T), $[\eta]_A$ is the intrinsic viscosity (dl/g) of a crystalline propylene polymer moiety (A), $W_A$ is the amount (% by weight) of a crystalline propylene polymer moiety (A), and $W_B$ is the amount (% by weight) of a crystalline propylene polymer moiety (B).

Also in view of the melt strength of a propylene polymer (T), it is further preferable that the intrinsic viscosity $[\eta]_A$ (dl/g) and the amount $W_A$ (% by weight) of (A) satisfy the following Equation 3.

$$W_A \geq 400 \times \text{EXP}(-0.6 \times [\eta]_A) \quad \text{[Equation 3]}$$

A value of $W_A$ within the range specified above is preferable since it gives a satisfactory improvement in the melt strength.

Each of (A) and (B) is a crystalline propylene polymer having a polypropylene crystal structure, and is preferably a propylene homopolymer or a copolymer of a propylene with ethylene and/or a comonomer such as an α-olefin having in an amount which does not allow the crystallinity to be lost. Such α-olefin may for example be 1-butene, 4-methyl-1-pentene, 1-octene and 1-hexene. While the amount which does not allow the crystallinity to be lost mentioned here may vary depending on the type of the comonomer, ethylene in a copolymer may be present usually in an amount as ethylene of 10% by weight or less, and other α-olefins such as 1-butene in a copolymer may be present usually in an amount as α-olefin unit of 30% by weight or less. (A) and (B) may have the same or different composition. Some of (A) and (B) may also be bound to each other as a block. In addition, a block of (A) and (B) may also coexist with other (A) and (B).

Another example of (B) is a polymer in which a non-crystalline ethylene·α-olefin copolymer is dispersed in a crystalline propylene polymer (T). Such propylene polymer (T) can be produced by using a solid catalyst containing a Ti, Mg or halogen atom and the like, for example in accordance with a method described in Japanese Unexamined Patent Publication No. 11-228629.

A foaming agent employed in the invention is not limited particularly, and may be a physical foaming agent such as carbon dioxide gas, nitrogen gas, air, propane, butane, pentane, hexane, dichloroethane, dichlorodifluoromethane, dichloromonofluoromethane and trichloromonofluoromethane, which may be employed alone or in combination with each other, and a preferred gas is a safe, environmental-conscious inorganic gas such as nitrogen gas, carbon dioxide gas and air, with carbon dioxide gas being most preferable. Carbon dioxide gas is preferable also because of its relatively high solubility in a polypropylenic resin when compared with other inorganic gases. Carbon dioxide gas is in a ultracritical state at 7.4 MPa or higher and 31° C. or higher, whereby exhibiting a satisfactory dispersion and dissolution in a resin. A chemical foaming agent may for example be sodium bicarbonate, a mixture of sodium bicarbonate with an organic acid such as citric acid, sodium citrate and stearic acid, azodicarboxylic acid amide, an isocyanate compound such as tolylene diisocyanate and 4,4'-diphenylmethane diisocyanate, an azo or diazo compound such as azobisbutyronitrile, barium azodicarboxlyate, diazoaminobenzene and trihydrazinotriazine, a hydrazine derivative such as benzenesulfonyl hydrazide, p,p'-oxybis (benzensulfonyl) hydrazide and toluenesulfonyl hydrazide, a nitroso compound such as N,N'-dinitrosopentamethylene tetramine and N,N'-dimethyl-N,N'-dinitrosoterephthalamide, a semicarbazide compound such as p-toluenesulfonyl semicarbazide and 4,4'-oxybisbenzenesulfonyl semicarbazide as well as an azi-compound and a triazole compound, any of which may be employed alone or in combination with each other, with sodium carbonate, citric acid and azodicarboxylic acid amide being preferred especially.

While any of these physical and chemical foaming agent may be employed alone, it may also be employed in combination with each other. When a chemical foaming agent is employed, it can be used together with a foaming aid in order to regulate its decomposition temperature or rate. For example, azodicarboxylic acid amide, whose decomposition temperature is as high as 200° C., may be used in the presence of a small amount of zinc oxide, zinc stearate or urea as a foaming aid when a low temperature processing is desired.

In a case of a physical foaming process, it is especially frequent to add a cell nucleus, such as talc, silica, kieselguhr, calcium carbonate, magnesium carbonate, barium sulfate, aluminum hydroxide, magnesium hydroxide, calcium hydroxide, calcium silicate, zeolite, mica, clay, wallastonite, hydrotalcite, magnesium oxide, zinc oxide, zinc stearate, calcium stearate, polymer beads such as PMMA, synthetic aluminosilicate and any of chemical foaming aids listed above, which may be added in a small amount.

In the invention, resins and foaming agents are kneaded by using plural extruders, and then laminated and integrated in a multi-layer circular die connected to the extruders, and then coextruded into the outside. A cylindrical molten sheet thus obtained is then cooled by being applied onto a cylindrical mandrel, which is located immediately after the die with being regulated for cooling and is larger than the die diameter, and then the cylindrical sheet is slit by a cutter or a blade placed on at least one site, whereby being opened into at least one planar sheet, which is then retracted using a haul-off equipment fitted with a nip role and then wound using a winder to obtain a multi-layer foamed sheet.

An extruder employed here may for example be a single- or milti-screw extruder, as well as a tandem extruder consisting of plural extruders. An extruder for a foam layer is preferably a twin-screw extruder, especially one whose output per screw rotation is so large that a predetermined output can be obtained at a low rotation speed where reducing the shear heat generation due to the screw rotation. A coolant may be circulated through the screw itself to control the temperature.

A gear pump between an extruder and a die and a metered feeder for supplying a raw material may be provided to establish an advantageous controlling system by which a feedback to a screw rotation speed and a raw material input is effected in order to control the gear pump inlet pressure at a constant level.

It is also advantageous to insert a static mixer or equivalent into an adapter communicating an extruder to a die whereby ensuring an uniform resin temperature.

While a foaming extruder in a case of a physical foaming process has a structure enabling the introduction of a foaming agent under pressure halfway of the extruder, it is important that a resin material should sufficiently be melted and plasticized before the position of the introduction and that the resin and the foaming agent should sufficiently be mixed and homogenized after the position of the introduction whereby controlling the resin temperature at a level suitable for the foaming process. Preferably, a channel structure of a multi-layer circular is a structure which allows the thickness of each layer to be controlled in the direction of the circumference and also allows each layer to be merged and laminated with each other at a position close to the die tip (i.e., a multi-manifold system), whereby achieving an advantageously uniform thickness of each layer in the direction of the circumference. For the purpose of reducing the diffusion of a foaming agent gas in the die from a foam layer into a non-foam layer and also for the purpose of ameliorating a poor appearance due to the degassing of the foaming agent gas once diffused into the non-foam layer, the position where the layers are merged is preferably close to the die tip.

While the inside of a cylindrical sheet once coextruded from a die is cooled in a mandrel, an airing may be provided outside of the circumference of the mandrel if necessary to blow an air onto the sheet in aid of the cooling.

In addition, a surface treatment given usually to the surface of a polypropylenic resin foamed sheet, such as a corona discharge treatment, an ozone treatment or an antistatic coating may also be performed.

While the expansion ratio and the foamed sheet shape in the invention may vary depending on various parameters such as the die diameter, the mandrel diameter, the resin, the foaming agent and the haul-off and molding conditions, it is not limited particularly, and a multi-layer foamed sheet having a satisfactory layer structure can be obtained at a high expansion ratio.

For example, in a case of a two-material three-layered sheet using carbon dioxide gas as a foaming agent, a multi-layer foamed sheet having a satisfactory layer structure whose expansion ratio is 1.1 to 10 times and whose thickness is 0.2 to 3 mm can be obtained.

An expansion ratio mentioned here means the apparent expansion ratio of an entire multi-layer foamed sheet rather than the expansion ratio only of a foam layer, and a thickness means the thickness of an entire sheet.

A multi-layer foamed sheet obtained according to the invention may be laminated if necessary with a skin material such as a sheet or a film, and such multi-layer foamed sheet or a foamed sheet laminated with a skin material such as a sheet or a film may be subjected to a heat molding such as a vacuum molding.

A skin material for a lamination, such as a sheet or a film, may be any one of known materials, including foils of metals such as aluminum and iron, thermoplastic resin sheets, thermoplastic resin films, embossed thermoplastic resin sheets, embossed thermoplastic resin films, thermoplastic resin foamed sheets, syntnetic papers, unwoven fabrics, linens, glass wools, carpets and the like.

For example, when used for a food product, a 10 to 100 $\mu$m-thick polypropylene resin film or gas barrier resin film is laminated frequently. Such barrier resin may, for example, be EVOH (ethylene/vinyl alcohol copolymer), PVDC (polyvinylidene chloride), PVA (polyvinyl alcohol), PA (polyamide) and the like. Any of these gas barrier resins may be employed alone or in a mixture with each other, and two or more films of a single material may be laminated and used.

For example when used in an automobile interior, unwoven fabrics, woven fabrics, linens, glass wools and carpets are laminated frequently. Otherwise when used in a package, for example, as a partition in a box, a shock-absorbing sheet such as a highly expanded foamed sheet may be laminated to promote the protection of a content.

The method for laminating a skin material is not limited particularly, and may for example be [1] a method in which an adhesive is applied onto a foam sheet to effect a lamination, [2] a method in which a sheet or a film laminated with an adhesive resin film is used and the side of the adhesive resin film is heated and fused with a foam, [3] a method in which a heater or a hot air is employed instead of an adhesive or an adhesive resin film and the surfaces of the both layers are fused directly with each other, and [4] a method in which a molten resin is extruded into the gap between a skin material and a foam sheet whereby effecting a lamination.

A heat molding may, for example, be a vacuum molding or a heat scoring, although it is not limited particularly. Since a foamed sheet according to the invention has satisfactory layer structure, thickness distribution and a fine cell, it exhibits an excellent heat molding performance.

EXAMPLES

The invention is further described in the following Examples, to which the invention is never restricted unless its spirit is not affected.

(1) Intrinsic Viscosity of Polymer

An Ubbelohde viscometer was employed for a measurement in tetralin at 135° C. The intrinsic viscosity of a crystalline propylene polymer moiety (B) was obtained in accordance with the equation described in the specification from the intrinsic viscosities of a crystalline propylene polymer moiety (A) and an entire propylene polymer (T).

(2) Molecular Weight Distribution

G.P.C. (gel permeation chromatography) was employed under the conditions specified below. A molecular weight distribution was assessed based on the ratio (Mw/Mn) between a weight average molecular weight (Mw) and a number average molecular weight (Mn).

Instrument: Model 150 CV (Millipore Waters)
Column: Shodex M/S 80
Temperature: 145° C.
Solvent: o-Dichlorobenzene
Sample concentration: 5 mg/8 mL A calibration curve was made using a standard polystyrene. The standard polystyrene (NBS706: Mw/Mn=2.0) when determined under the conditions described above had a Mw/Mn of 1.9 to 2.0.

(3) MFR

An MFR was measured in accordance with JIS K7210 at 230° C. under the load of 2.16 kgf.

(4) Melt Tension (MT)

A melt tension tester Model MT-501D3 manufactured by TOYOSEIKI was employed with the sample amount of 5 g, the preheating temperature of 190° C., the preheating time of 5 minutes, the extrusion speed of 5.7 mm/min, and a strand was extruded from an orifice of 8 mm in length and 2 mm in diameter, and then wound at 100 rpm using a roller of 50 mm in diameter while being examined for its tension, which was expressed as a melt tension (MT) in grams, (5) Calculation of Constants K and n and Layer Interface Shear Stress A resin employed in each layer was examined for its Constants K and n using a capillary rheometer Model CAPIROGRAPH 1B manufactured by TOYOSEIKI. Using a barrel of 0.955 cm in inner diameter and an orifice of 4 cm in length and 0.1 cm in inner diameter, the resin was extruded at each piston speed of 0.2, 0.5, 1, 2, 5, 10, 20 and 50 cm/minute at the temperature similar to the processing temperature and examined for the resin pressure P (Pa). The resin pressure P (Pa) and the output Q (cc/s) were plotted logarithmically and subjected to a linear regression, and then the following Equation 4 was employed to calculate N and η, from which K and n were calculated in accordance with Equations 6 and 7.

$$\log(P)=\log(2L/r^{(N+3)/N})+(1/N)\log((N+3)\eta/\pi)+(1/N)\log(Q) \quad \text{[Equation 4]}$$

In Equation 4 shown above, L is the length of the orifice (4 cm), r is an inner diameter of the orifice (0.05 cm) and Q is calculated in accordance with the following Equation 5.

$$Q=\pi R^2 V \quad \text{[Equation 5]}$$

In Equation 5 shown above, R is the inner diameter of the barrel (0.4775 cm) and V is the piston speed converted into a value in cm/s.

$$K=\eta^{1/N} \quad \text{[Equation 6]}$$

$$n=1/N \quad \text{[Equation 7]}$$

Subsequently, Constants K and n, the processing conditions involving the die shape and the layer outputs were subjected to a multi-layer fluidization analysis according to a reference J. Appl. Polym. Sci., 17, 1203 (1973) whereby obtaining the shear stress of a layer interface.

(6) Expansion Ratio

In accordance with JIS K7112 using a water replacement method, the density $\rho f$ of a foam was determined. An expansion ratio is a quotient obtained by dividing a non-foam thermoplastic resin density $\rho s$ by $\rho f$. While a polypropylene resin was employed in Examples, an expansion ratio was calculated assuming $\rho s$=0.9 g/cc.

(7) Foam Appearance

A scale-like poor appearance and a degassing-induced poor appearance were evaluated visually and classified into any of three degrees ⊙, ○ and X, wherein ⊙ represents no poor appearance, ○ represents no practical defect and X represents a practical defect.

Reference Examples (Production of Polypropylenic Resin PP1)

[1] (Synthesis of Solid Catalyst Component)

A 200-L SUS reactor fitted with a stirrer was purged with nitrogen, and then received 80 L of hexane, 6.55 moles of tetrabutoxyethane, 2.8 moles of diisobutyl phthalate and 98.9 moles of tetraethoxysilane, which were then mixed uniformly to form a solution. Subsequently, 51 L of a 2.1 moles/L solution of butylmagnesium chloride in diisobutylether was added dropwise over 5 hours with keeping the temperature inside of the reactor at 5° C. After completion of the addition followed by stirring further for 1 hour at room temperature, the phases were separated at room temperature and then washed three times with 70 L of an isolate toluene.

Toluene was then added to adjust the slurry concentration at 0.6 Kg/L, and then a mixture of 8.9 moles of n-butyl ether and 274 moles of titanium tetrachloride was added followed by 20.8 moles of phthalic acid chloride, and then the reaction was continued for 3 hours at 110° C. After completion of the reaction, the reactant was washed twice with toluene at 95° C.

Subsequently, the slurry concentration was adjusted at 0.6 kg/L and then 3.13 moles of diisobutyl phthalate, 8.9 moles of n-butyl ether and 137 moles of titanium tetrachloride were added, and the reaction was continued for 1 hour at 105° C. After completion of the reaction, the phases were separated at the same temperature, and the reactant was washed twice with 90 L of toluene.

Subsequently, the slurry concentration was adjusted at 0.6 kg/L and then 8.9 moles of n-butyl ether and 137 moles of titanium tetrachloride were added, and the reaction was continued for 1 hour at 95° C. After completion of the reaction, the phases were separated at the same temperature, and the reactant was washed three times with 90 L of toluene at the same temperature.

Subsequently, the slurry concentration was adjusted at 0.6 kg/L and then 8.9 moles of n-butyl ether and 137 moles of titanium tetrachloride were added, and the reaction was continued for 1 hour at 95° C. After completion of the reaction, the phases were separated at the same temperature, and the reactant was washed three times with 90 L of toluene at the same temperature and then further washed three times with 90 L of hexane, and the reactant was dried under reduced pressure to obtain 11.0 kg of a solid catalyst component.

The solid catalyst component contained 1.9% by weight of titanium element, 20% by weight of magnesium element, 8.6% by weight of phthalates, 0.05% by weight of ethoxy group and 0.21% by weight of butoxy group, and exhibited a satisfactory granular state without any fine particles.

[2] (Preliminary Activation of Solid Catalyst Component)

A 3-L SUS autoclave fitted with a stirrer was charged with 1.5 L of sufficiently dehydrated and deaerated n-hexane, 37.5 mmoles of triethylaluminium, 3.75 mmoles of t-butyl-n-propyldimethoxysilane and 15 g of the solid catalyst component obtained in [1] described above, and the temperature inside of the reactor was kept at 5 to 15° C. while supplying 15 g of propylene continuously over a period of 30 minutes whereby effecting a preliminary activation.

[3] (Polymerizaiton of Crystalline Propylene Polymer Moiety (A))

A 300-L SUS reactor received a liquid propylene at the rate of 57 kg/h so that the polymerization temperature was kept at 60° C. and the polymerization pressure was kept at 27 kg/cm$^2$, while being supplemented continuously with triethylaluminium at 1.3 mmoles/h, t-butyl-n-propyldimethoxysilane at 0.13 mmoles/h, and the preliminarily activated solid catalyst component at 0.51 g/h, whereby effecting a propylene polymerization substantially in the absence of hydrogen to obtain a polymer at 2.0 kg/h. The polymer yield per gram of the catalyst achieved here was 3920 g, an aliquot of which was taken as a sample for an analysis, which revealed that the intrinsic viscosity was 7.7 dl/g. The resultant polymer was transferred directly to the second reactor.

[4] (Polymerizaiton of Crystalline Propylene Polymer Moiety (B))

A 1-m$^3$ fluidized bed reactor fitted with a stirrer received propylene and hydrogen so that the polymerization temperature was kept at 80° C., the polymerization pressure at 18 g/cm$^2$G and the gas phase hydrogen level at 8% by volume, while being supplemented continuously with the catalyst-containing polymer from the first reactor and triethylaluminium at 60 mmoles/h and t-butyl-n-propyldimethoxysilane at 6 mmoles/h, whereby continuing the propylene polymerization to obtain a polymer at 18.2 kg/h. The intrinsic viscosity of this resultant polymer was 1.9 dl/g.

Based on the results described above, the polymer yield per gram of the catalyst during the polymerization of (B) was 31760 g, the polymerization weight ratio between the first and the second reactors was 11:89 and the intrinsic viscosity of (B) was revealed to be 1.2 dl/g.

[5] (Polymer Pelletization)

100 Parts by weight of the polymer powder thus obtained was combined with 0.1 parts by weight of calcium stearate, 0.05 parts by weight of *IRGANOX* (Trade Name, Ciba-Geigy) and 0.2 parts by weight of *SUMILYZER* (Trade name, SUMITOMO CHEMICAL CO., LTD.), and kneaded at 230° C. to obtain a pellet (polypropylenic resin PP1) whose melt flow rate (MFR) was 12 g/10 minutes and whose molecular weight distribution (Mw/Mn) was 8.0. This pellet was examined for its melt tension (MT), which was revealed to be 4.7 g, from which the right side of Equation A: $7.52 \times \text{MFR}^{(-0.576)}$ was 1.80, which satisfied Equation A.

Example 1 (Extrusion Foaming Test)

Using the method shown below, a two-material three-layered polypropylenic resin multi-layer foamed sheet having a foam layer as an intermediate layer sandwiched between non-foam layers was produced.

A 65 mm-ID isotropically rotating twin-screw extruder (L/D=41.5, L:Valid screw length, D:Screw diameter) as a foam layer extruder and a 60 mm-ID single-screw extruder (L/D=30) as a non-foam layer extruder, which were fitted with a 230 mm-ID multi-layer circular die (outer lip radius $r_2$=11.710 cm, inner lip radius $r_1$=11.515 cm, lip gap r2-r1= 0.195 cm), were employed.

A raw resin comprising a mixture of 70 Parts by weight of polypropylenic resin PP1 obtained in REFERENCE EXAMPLE 1 [5] described above (MFR=12) and 30 parts by weight of a low density polyethylene PE1 (manufactured by SUMITOMO CHEMICAL CO., LTD., *SUMI-KACENE* G201) blended with 1 PHR of a cell nucleus (manufactured by NIPPON BOEHRINGER INGELHEIM, *HYDROCELLOL* CF40E) was introduced via a metering feeder into a foam layer extruder hopper and kneaded and then at the position where the melting was sufficient (L/D=20) 0.8 PHR of a liquefied carbon dioxide gas was infused under elevated pressure using a diaphragm metering pump. After kneading the raw resin and the carbon dioxide gas sufficiently, the material was cooled and tempered to 185° C. and then introduced stably into a multi-layer die using a gear pump adjusted at the output rate of 110 kg/h (40.7 cc/s, assuming that the density of the molten resin was 0.75 g/cc). On the other hand, polypropylenic resin PP2 (manufactured by SUMITOMO CHEMICAL CO., LTD., *NOBLENE* AW161C (MFR=8)) was introduced via a metering feeder into a non-foam layer extruder hopper and then the material was cooled and tempered to 185° C. and then the material was introduced into a multi-layer die at the output rate of 33 kg/h (12.2 cc/s, assuming that the density of the molten material was 0.75 g/cc). A cylindrical foamed sheet extruded from the multi-layer die was then blown up by a mandrel located just downstream thereof whose outer diameter was 700φ and which had been chiller-cooled, and subsequently this cylindrical foamed sheet was slit at its both side by cutters into two widespread planar sheets stacked with each other, each of about 1100 mm in width, and then each sheet was retracted using a haul-off equipment fitted with a nip role at the speed of 3.9 m/min and then wound using a biaxial terret electric counter-rotating winder.

Subsequently, Constants K and n were determined using a capillary rheometer at 185° C. which was the processing temperature and were revealed to be 4740 (Pa·s$^n$) and 0.500 (·), respectively, for the mixture of PP1 and PE1 described above, and 8500 (Pa·s$^n$) and 0.377 (–), respectively, for PP2. The shear stress at the layer interface was calculated to be 36100 (Pa).

The resultant foamed sheet had the expansion ratio of 3.7 and the thickness of 1.0 mm, evaluated as ○ for the scale-like appearance, had a fine cell, thus being judged as a satisfactory sheet.

Example 2 and Comparative Example 1

Using different resins for non-foam layers and using the procedure similar to that in Example 1, the results summarized in Table 1 were obtained.

TABLE 1

| | Non-foam Layer resin | | | Layer interface | Scale-like | | Expansion | |
|---|---|---|---|---|---|---|---|---|
| | Type — | K Pa.s$_n$ | n — | shear stress Pa | appearance — | Degassing — | ratio — | Thickness mm |
| Example 1 | PP2 | 8500 | 0.377 | 36100 | ◯ | ◯ | 3.7 | 1.0 |
| Example 2 | PP3 | 5910 | 0.407 | 30140 | ◉ | ◯ | 3.7 | 1.0 |
| Comparative Example 1 | PP4 | 16230 | 0.342 | 51560 | X | ◉ | 3.7 | 1.0 |

Remarks 1) Non-foam layer resins
PP2: Manufactured by SUMITOMO CHEMICAL CO., LTD., *NOBLENE* AW161C (MFR = 8)
PP3: Manufactured by SUMITOMO CHEMICAL CO., LTD., *NOBLENE* AY161C (MFR = 15)
PP4: Manufactured by SUMITOMO CHEMICAL CO., LTD., *NOBLENE* AH161C (MFR = 3)

Examples 3 and 4

Examples 3 and 4 employed the procedure similar to that in Example 1 instead of using the formulations containing 2 and 3 resins, respectively, as non-foaming layer resins, and the results are summarized in Table 2.

Example 3, employed as a resin for a non-foam layer a mixture of 70 parts by weight of PP2 and 30 parts by weight of PE1.

Example 4, employed as a resin for a non-foam layer a mixture of 49 parts by weight of PP2, 21 parts by weight of PP4 and 30 parts by weight of PE1. The MFR of the entire linear polypropylenic resin of these PP2 and PP4 (weight ratio of 49:21) was 6, and the resin for the non-foam layer was processed at 200° C. instead of 185° C. (only in Example 4).

TABLE 2

| | Non-foam Layer resin | | | Layer interface | Scale-like | | Expansion | |
|---|---|---|---|---|---|---|---|---|
| | Type — | K Pa.s$_n$ | n — | shear stress Pa | appearance — | Degassing — | ratio — | Thickness mm |
| Example 3 | PP2/ PE1 | 11970 | 0.353 | 43080 | ◯ | ◉ | 3.7 | 1.0 |
| Example 4 | PP2/ PP4/ PE1 | 10818 | 0.361 | 41070 | ◯ | ◉ | 3.7 | 1.0 |

A method for producing a multi-layer foamed sheet by a multi-layer circular die coextrusion method according to the invention is capable of controlling the shear stress at a layer interface in a die and stabilizing a layer structure, whereby providing a multi-layer foamed sheet having a satisfactory layer structure from various raw resins under various processing conditions. It is suitable especially for the production of a thin and highly expanded multi-layer foamed sheet. A multi-layer foamed sheet can take advantage of its light weight and heat-insulating performance and can be used in packages, food containers, stationeries, building materials and automobile interiors, and it is also possible, by selecting an appropriate layer structure, to expect a high added value which is experienced as an improved mechanical property or function as well as an improved adhesion performance onto various articles.

What is claimed is:

1. A method for producing a multi-layer foamed sheet having foam and non-foam layers made by a multi-layer circular die coextrusion method, wherein the shear stress at the interface of each layer of said multi-layer foamed sheet is 5000 Pa or higher and not higher than 50000 Pa at the time when the multi-layer sheet is extruded through a die lip.

2. The method for producing a multi-layer foamed sheet according to claim 1, wherein said non-foam layer comprises a linear propylenic resin having a melt flow rate of 5 to 30 g/10 minutes.

3. The method for producing a multi-layer foamed sheet according to claim 1, wherein said foam layer comprises a propylenic resin whose melt tension (MT) at 190° C. and melt flow rate (MFR) at 230° C. satisfy the following equation A:

$$MT \geq 7.52 \times MFR\ (-0.576)$$ [Equation A].

4. The method for producing a multi-layer foamed sheet according to claim 1 wherein said foam layer comprises a resin which comprises a propylene polymer (T) obtained by a polymerization method comprising a step for producing a crystalline propylene polymer moiety (A) having an intrinsic viscosity of 5 dl/g or higher and a step for producing a crystalline propylene polymer moiety (B) having an intrinsic viscosity less than 3 dl/g wherein the intrinsic viscosity of the entire resin is less than 3 dl/g and wherein the crystalline propylene polymer moiety (A) is present in an amount of 0.05% by weight or higher and less than 35% by weight based on the entire resin.

5. The method for producing a multi-layer foamed sheet according to claim 1 wherein the layer structure is a two-material three-layered structure with a non-foam layer/foam layer/non-foam layer structure.

6. The method for producing a multi-layer foamed sheet according to any one of claims 1 to 4 wherein the layer structure is a three-material five-layered structure with a non-foam layer/recycle layer/foam layer/recycle layer/non-foam layer structure wherein said recycle layer is a non-foam recycle layer formed from a chip made by grinding any of the multi-layer foamed sheets according to any of claims 1 to 4 or from a recycled pellet made by deaerating and pelletizing said chip.

* * * * *